US012573884B2

(12) United States Patent
Park et al.

(10) Patent No.:    US 12,573,884 B2
(45) Date of Patent:        Mar. 10, 2026

(54) WIRELESS POWER TRANSMISSION SYSTEM COMPRISING WIRELESS POWER RECEIVER AND WIRELESS POWER DEVICE

(71) Applicant: SAMSUNG ELECTRONICS CO., LTD., Suwon-si (KR)

(72) Inventors: Sungbum Park, Suwon-si (KR); Cheonyong Lim, Suwon-si (KR); Youngho Ryu, Suwon-si (KR); Kyungmin Lee, Suwon-si (KR); Sangwook Lee, Suwon-si (KR); Jinsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 18/200,969

(22) Filed: May 23, 2023

(65) Prior Publication Data

US 2023/0299617 A1      Sep. 21, 2023

Related U.S. Application Data

(63) Continuation of application No. PCT/KR2021/018126, filed on Dec. 2, 2021.

(30) Foreign Application Priority Data

Dec. 7, 2020    (KR) ........................ 10-2020-0169632

(51) Int. Cl.
 *H02P 27/08*        (2006.01)
 *G01R 19/165*      (2006.01)
(Continued)

(52) U.S. Cl.
 CPC .............. *H02J 50/12* (2016.02); *H02J 50/80* (2016.02); *H02P 27/00* (2013.01)

(58) Field of Classification Search
 CPC ....... H02P 27/08; H02P 27/00; G01R 19/165; H02J 50/80; H02J 50/12
(Continued)

(56) References Cited

U.S. PATENT DOCUMENTS 9,660,486 B2 *    5/2017   Lee ..................... H02J 7/00047
2007/0178857 A1   8/2007   Greene et al.
(Continued)

FOREIGN PATENT DOCUMENTS

JP        2009-262254 A     11/2009
JP        2015-2598 A        1/2015
(Continued)

OTHER PUBLICATIONS

Communication dated Mar. 10, 2022, issued by the International Searching Authority in counterpart International Application No. PCT/KR2021/018126 (PCT/ISA/210).
(Continued)

*Primary Examiner* — Gabriel Agared
(74) *Attorney, Agent, or Firm* — Sughrue Mion, PLLC

(57)        ABSTRACT

A wireless power receiver includes a resonance circuit configured to generate an induced current based on a magnetic field generated by a wireless power transmitter, a diode connected to a first end of the resonance circuit and to a second end of the resonance circuit, and an inductive load connected to a first end of the diode and a second end of the diode.

20 Claims, 10 Drawing Sheets

(51) Int. Cl.
    *H02J 50/12*           (2016.01)
    *H02J 50/80*           (2016.01)
    *H02P 27/00*           (2006.01)

(58) Field of Classification Search
    USPC ........................................................ 318/16
    See application file for complete search history.

(56)            References Cited

U.S. PATENT DOCUMENTS

| | | | |
|---|---|---|---|
| 2010/0148723 A1 | 6/2010 | Cook et al. | |
| 2010/0190435 A1 | 7/2010 | Cook et al. | |
| 2013/0099591 A1* | 4/2013 | Yeo .................... | H02M 3/3376 |
| | | | 307/104 |
| 2013/0241303 A1 | 9/2013 | Bae | |
| 2015/0333801 A1* | 11/2015 | Hosotani ................. | H04B 5/22 |
| | | | 307/104 |
| 2016/0172869 A1* | 6/2016 | Park ........................ | H02J 50/12 |
| | | | 307/104 |
| 2016/0226298 A1* | 8/2016 | Shimokawa ............. | H04B 5/79 |
| 2017/0310162 A1* | 10/2017 | Matsumoto ............. | H02J 50/05 |
| 2019/0097459 A1* | 3/2019 | Ettes ....................... | H02J 50/12 |
| 2020/0223422 A1* | 7/2020 | Ye ........................... | B60K 6/485 |
| 2020/0348945 A1* | 11/2020 | Shahi ..................... | H04W 4/50 |
| 2022/0037926 A1 | 2/2022 | Omori et al. | |

FOREIGN PATENT DOCUMENTS

| | | | |
|---|---|---|---|
| KR | 1998-031475 | U | 8/1998 |
| KR | 10-2011-0014942 | A | 2/2011 |
| KR | 10-2011-0050697 | A | 5/2011 |
| KR | 10-2013-0044647 | A | 5/2013 |
| KR | 10-2013-0095906 | A | 8/2013 |
| KR | 10-2013-0116230 | A | 10/2013 |
| KR | 10-2013-0130192 | A | 12/2013 |
| KR | 10-2020-0059655 | A | 5/2020 |
| KR | 10-2020-0075590 | A | 6/2020 |
| WO | 2014/038017 | A1 | 3/2014 |
| WO | 2020/091042 | A1 | 5/2020 |

OTHER PUBLICATIONS

Communication dated Mar. 10, 2022, issued by the International Searching Authority in counterpart International Application No. PCT/KR2021/018126 (PCT/ISA/237).
Office Action dated Jan. 9, 2025. issued by Korean Patent Office in Korean Patent Application No. 10- 2020-0169632.
Office Action issued Sep. 18, 2025 by the Korean Patent Office for KR Patent Application No. 10-2020-0169632.
Communication dated Jan. 1, 2026, issued by the Korean Patent Office in Korean Application No. 10-2020-0169632.

* cited by examiner

Voltage [V]

Time [μs]

Current [A]

Time [μs]

WIRELESS POWER TRANSMISSION SYSTEM COMPRISING WIRELESS POWER RECEIVER AND WIRELESS POWER DEVICE

CROSS-REFERENCE TO RELATED APPLICATIONS

This application is a by-pass continuation application of International Application No. PCT/KR2021/018126, filed on Dec. 2, 2021, which is based on and claims priority to Korean Patent Application No. 10-2020-0169632, filed on Dec. 7, 2020, in the Korean Intellectual Property Office, the disclosures of which are incorporated by reference herein their entireties.

BACKGROUND

1. Field

The disclosure relates to a wireless power transmission system including a wireless power receiver and a wireless power device.

2. Description of Related Art

A wireless charging technology using an electromagnetic induction scheme or a magnetic resonance scheme has recently become popular mainly for electronic devices such as smartphones. When a wireless power receiver (e.g., a smartphone) contacts a wireless power transmitter (e.g., a wireless charging pad) or approaches within a certain distance from the wireless power transmitter, the wireless power receiver may be charged by electromagnetic induction or electromagnetic resonance between a transmission coil of the wireless power transmitter and a reception coil of the wireless power receiver.

When a wireless power receiver includes a battery and uses received wireless power to charge the battery, like a smartphone, the wireless power receiver may include circuits for converting the voltage and current of the wireless power to satisfy voltage and/or current conditions to charge the battery. As illustrated in FIG. 1, for example, a wireless power receiver 100 with a battery 160 may include a rectifier circuit 120, a capacitor 130, a direct current/direct current (DC/DC) converter 140, and a charger 150 to convert wireless power received from a resonance circuit 110 into power having a voltage and/or current suitable for charging the battery 160.

Because the wireless power receiver 100 illustrated in FIG. 1 includes the rectifier circuit 120, the capacitor 130, the DC/DC converter 140, and the charger 150, there may be limitations in miniaturizing the wireless power receiver 100 and reducing the number of elements to manufacture the wireless power receiver 100.

SUMMARY

Unlike the wireless power receiver 100 illustrated in FIG. 1, a wireless power receiver according to embodiments may include an inductive load that allows for input of power having an alternating current (AC) component, alternative to the battery 160. The wireless power receiver according to embodiments may include a diode connected to both ends of a resonance circuit and an inductive load connected to both ends of the diode.

According to an aspect of the disclosure, a wireless power receiver includes: a resonance circuit configured to generate an induced current based on a magnetic field generated by a wireless power transmitter, a diode connected to a first end of the resonance circuit and to a second end of the resonance circuit, and an inductive load connected to a first end of the diode and a second end of the diode.

According to another aspect of the disclosure, a wireless power transmission system includes a wireless power transmitter and a wireless power receiver. The wireless power receiver includes: a resonance circuit configured to generate an induced current based on a magnetic field generated by the wireless power transmitter, a diode connected to a first end of the resonance circuit and to a second end of the resonance circuit, and an inductive load connected to a first end of the diode and to a second end of the diode.

Provided is a wireless power transmission system including a wireless power receiver and a wireless power device. Unlike the wireless power receiver 100 illustrated in FIG. 1, a wireless power receiver according to embodiments may include an inductive load that allows for input of power having an alternating current (AC) component, alternative to the battery 160. The wireless power receiver according to embodiments may include a diode connected to both ends of a resonance circuit and both ends of an inductive load. Because the diode is capable of rectifying power generated from the resonance circuit, and the inductive load allows for input of power having an AC component, the wireless power receiver according to embodiments may not include the rectifier circuit 120, the capacitor 130, the direct current/direct current (DC/DC) converter 140, and the charger 150 illustrated in FIG. 1. Therefore, the wireless power receiver according to an embodiment may be manufactured using fewer elements than the wireless power receiver 100 illustrated in FIG. 1, it may be miniaturized and produced at a low manufacturing cost, compared to the wireless power receiver 100 illustrated in FIG. 1.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
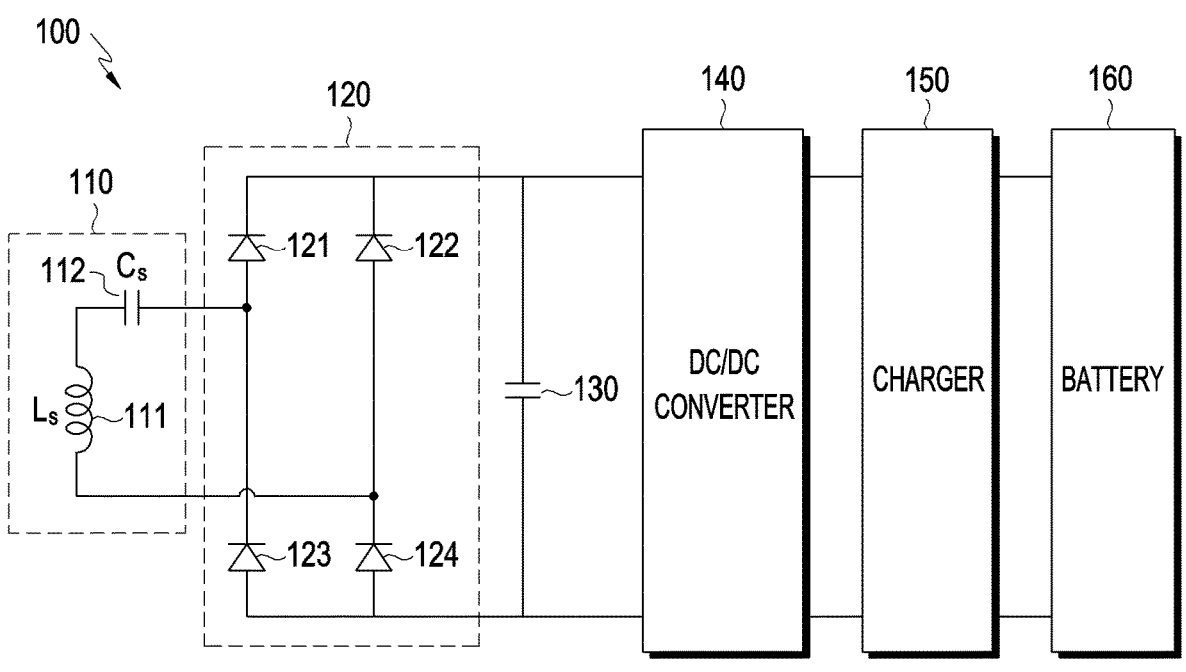
FIG. 1 illustrates the structure of a wireless power receiver according to a comparative example.

FIG. 1 illustrates the structure of a wireless power receiver according to a comparative example. Referring to FIG. 1, the wireless power receiver 100 may include the resonance circuit 110, the rectifier circuit 120, the direct current/direct current (DC/DC) converter 140, the charger 150, and the battery 160.

The resonance circuit 110 may include a coil 111 and a capacitor 112. An induced current may be generated in the coil 111 based on a magnetic field and/or an electric field formed by a wireless power transmitter, which may be referred to as wireless power reception. Alternating current (AC) power may be generated in the coil 111 and transmitted to the rectifier circuit 120.

The rectifier circuit 120 may be a bridge rectifier circuit including four diodes 121, 122, 123, and 124. The rectifier circuit 120 may rectify the AC power provided from the resonance circuit 110 into DC power.

The DC/DC converter 140 may convert or regulate a rectified voltage received from the rectifier circuit 120. According to an embodiment, the DC/DC converter 140 may provide power having a substantially constant voltage. According to an embodiment, the DC/DC converter 140 may not be included in the wireless power receiver 100 depending on implementation. In an embodiment in which the DC/DC converter 140 is not included, the expression "provided by the DC/DC converter 140" described in this disclosure may be understood as "provided by the charger 150", and the expression "provided from the DC/DC converter 140" may be understood as "provided from the rectifier circuit 120".

The charger 150 may receive the power output from the DC/DC converter 140 and charge the battery 160 connected to the charger 150 using the received power. The charger 150 may control a current and/or a voltage applied to the battery 160 based on various charging modes (e.g., constant current (CC) mode, constant voltage (CV) mode, or fast charging mode). For example, the charger 150 may control the current and/or the voltage applied to the battery 160 based on a charged state of the battery 160.

Figure 2:
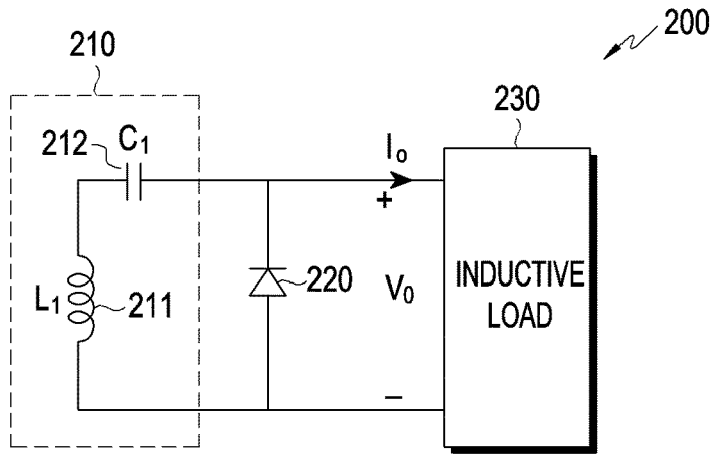
FIG. 2 illustrates a wireless power receiver according to an embodiment.

FIG. 2 illustrates a wireless power receiver according to an embodiment. Referring to FIG. 2, a wireless power receiver 200 according to an embodiment may include a resonance circuit 210, a diode 220, and an inductive load 230.

According to an embodiment, the resonance circuit 210 may include a coil 211 and a first capacitor 212. An induced current may be generated in the coil 211 based on a magnetic field and/or an electric field formed by a wireless power transmitter. Generation of a magnetic field and/or an electric field in the wireless power transmitter may be referred to as wireless power transmission, and generation of an induced current in the coil 211 may be referred to as wireless power reception. AC power may be generated in the coil 211. According to an embodiment, the coil 211 may be implemented as one or more coils, and the number of coils is not limited.

According to an embodiment, the diode 220 may be connected to both ends of the resonance circuit 210 and both ends of the inductive load 230. Specifically, a first end of the diode 220 may be connected to a first end of the resonance circuit 210 and a first end of the inductive load 230, and a second end of the diode 220 may be connected to a second end of the resonance circuit 210 and a second end of the inductive load 230.

According to an embodiment, the diode 220 may rectify wireless power generated in the resonance circuit 210 and supply the rectified power to the inductive load 230. According to an embodiment, the diode 220 may allow a positive voltage to be applied to the inductive load 230 and a positive current to flow through the inductive load 230.

According to an embodiment, the inductive load 230 may be a load having a positive reactance of impedance. While the battery 160 of FIG. 1 may receive DC power having a voltage and a current within a specific range, the inductive load 230 may allow the power supplied to the inductive load 230 to include an AC component.

According to an embodiment, the inductive load 230 may include a motor. When the inductive load 230 includes a motor and a periodic voltage and current are applied to the inductive load 230, the rotation speed of the motor may depend on the average of voltages applied to the motor during one period. As the average of voltages applied to the motor during one period increases, the rotation speed of the motor may increase. When the average of voltages applied to the motor during one period is zero, the motor may not rotate. According to an embodiment, when the inductive load 230 includes a motor, the wireless power receiver 200 may be a grinder or blender that operates based on wireless power received from the wireless power transmitter.

One thing to note is that because the inductive load 230 allows power supplied to the inductive load 230 to include an AC component and may not require supply of DC power having a voltage and current within a specific range, the diode 220 rectifying wireless power generated in the resonance circuit 210 may supply a voltage and current suitable for operation of the inductive load 230. Therefore, unlike the wireless power receiver 100 illustrated in FIG. 1, the wireless power receiver 200 may include the diode 220 without the rectifier circuit 120, the capacitor 130, the DC/DC converter 140, and the charger 150 illustrated in FIG. 1.

Figure 3A:
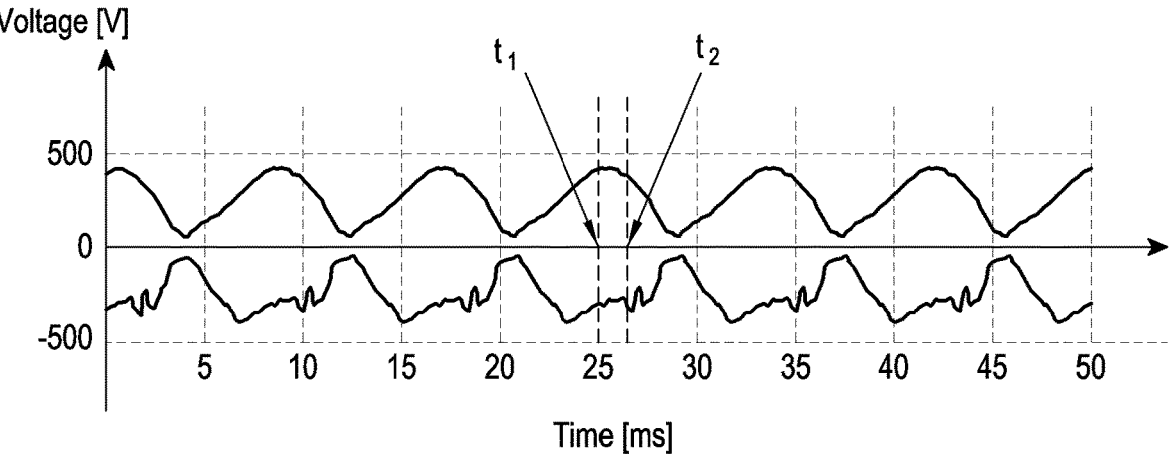
FIG. 3A illustrates a waveform of a voltage across a first coil in a wireless power receiver according to an embodiment.
Figure 3B:
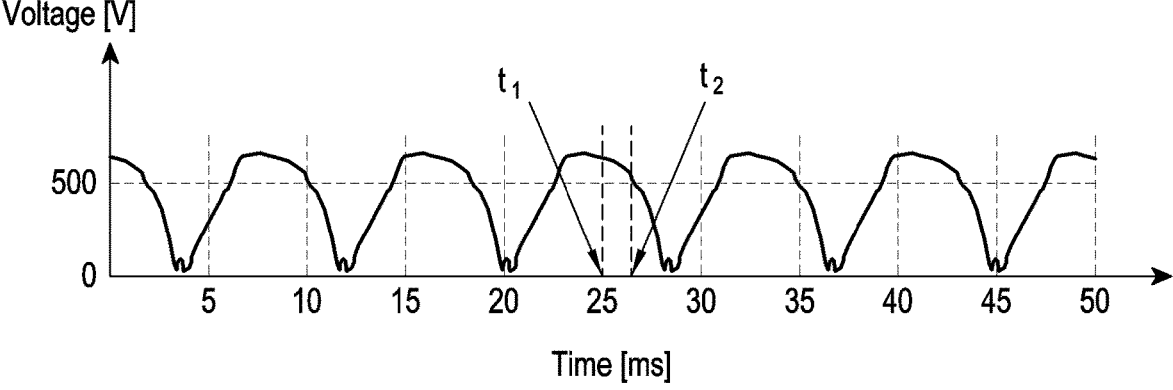
FIG. 3B illustrates a waveform of a voltage applied to an inductive load in a wireless power receiver according to an embodiment.
Figure 3C:
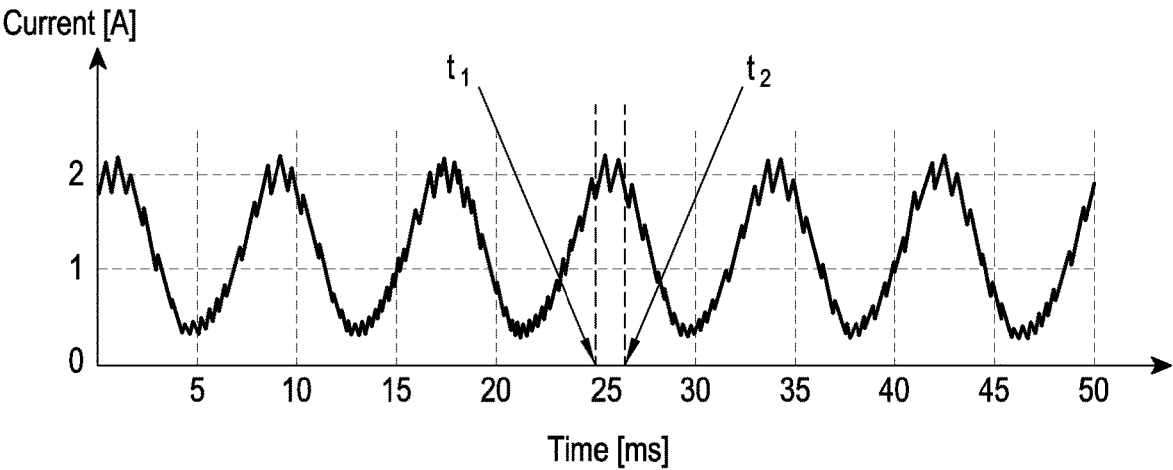
FIG. 3C illustrates a waveform of a current flowing through an inductive load in a wireless power receiver according to an embodiment.

FIG. 3A illustrates a waveform of a voltage across a coil included in a resonance circuit of a wireless power receiver according to an embodiment. FIG. 3B illustrates a waveform of a voltage applied to an inductive load in a wireless power receiver according to an embodiment. FIG. 3C illustrates a waveform of a current flowing through an inductive load in a wireless power receiver according to an embodiment. Specifically, FIG. 3A illustrates a voltage across the coil 211 in the wireless power receiver 200 illustrated in FIG. 2. FIG. 3B illustrates a voltage applied to the inductive load 230 in the wireless power receiver 200 illustrated in FIG. 2. FIG. 3C illustrates a current flowing through the inductive load 230 in the wireless power receiver 200 illustrated in FIG. 2.

Referring to FIG. 3A, the voltage applied across the coil 211 of the wireless power receiver 200 may have a positive value and a negative value and be repeated at regular intervals. A frequency at which the voltage waveform of FIG. 3A is repeated may be a frequency of power supplied to the wireless power transmitter, for example, 60 Hz.

Referring to FIG. 3B, it may be noted that because the diode 220 is connected in parallel to both the resonance circuit 210 and the inductive load 230, a voltage applied to the inductive load 230 has only a positive value. The voltage waveform of FIG. 3B may be repeated at the same frequency as the voltage waveform of FIG. 3A.

Referring to FIG. 3C, it may be noted that a current flowing through the inductive load 230 has only a positive value. The current waveform of FIG. 3C may be repeated at the same frequency as the voltage waveform of FIG. 3A.

Figure 4A:
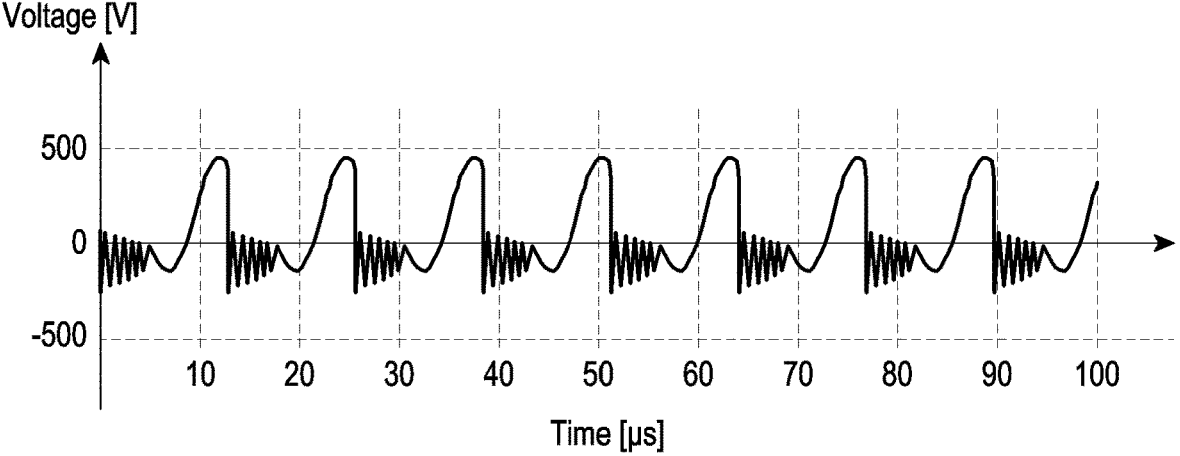
FIG. 4A illustrates a waveform of a voltage across a first coil in a wireless power receiver according to an embodiment.
Figure 4B:
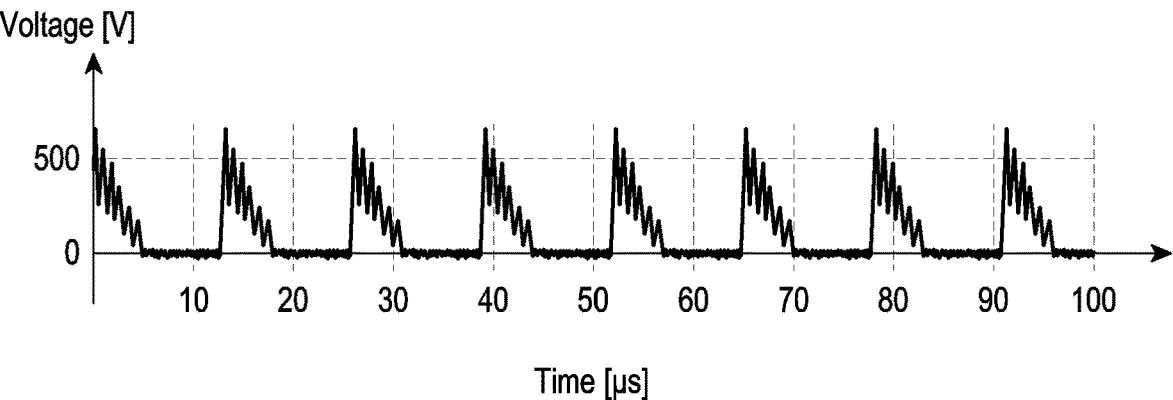
FIG. 4B illustrates a waveform of a voltage applied to an inductive load in a wireless power receiver according to an embodiment.
Figure 4C:
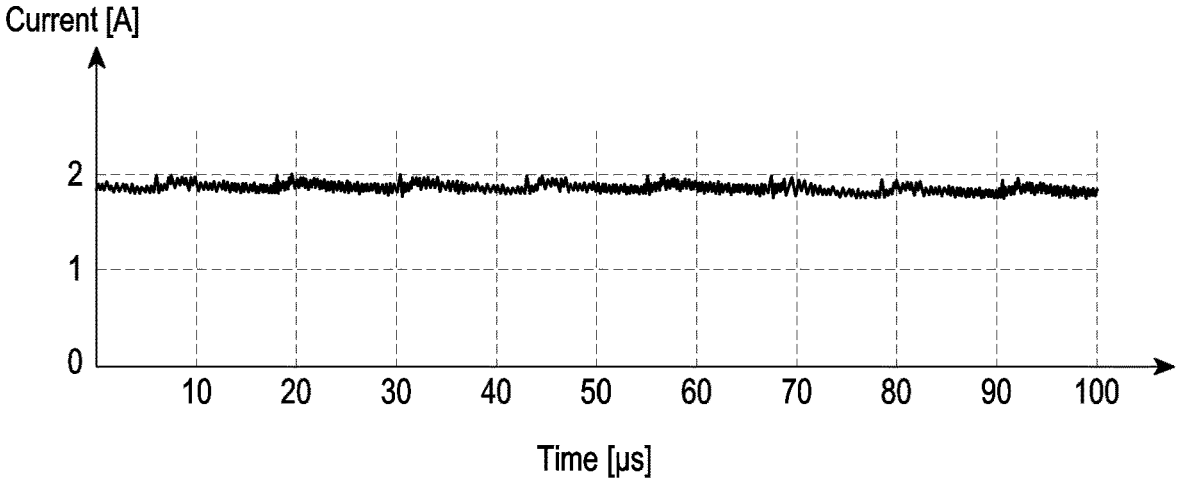
FIG. 4C illustrates a waveform of a current flowing through an inductive load in a wireless power receiver according to an embodiment.

FIG. 4A illustrates a waveform of a voltage across a coil included in a resonance circuit of a wireless power receiver according to an embodiment. FIG. 4B illustrates a waveform of a voltage applied to an inductive load in a wireless power receiver according to an embodiment. FIG. 4C illustrates a waveform of a current flowing through an inductive load in a wireless power receiver according to an embodiment. Specifically, FIG. 4A is an enlarged view illustrating a waveform during a period between $t_{-1}$ and $t_2$ in the waveform illustrated in FIG. 3A. FIG. 4B is an enlarged view illustrating a waveform during a period between $t_{-1}$ and $t_2$ in the waveform illustrated in FIG. 3B. FIG. 4C is an enlarged view illustrating a waveform during a period between $t_{-1}$ and $t_2$ in the waveform illustrated in FIG. 3C.

Referring to FIG. 4A, a voltage applied across the coil 211 of the wireless power receiver 200 may have a positive value and a negative value and be repeated at regular intervals. A frequency at which the voltage waveform of FIG. 4A is repeated may be a switching frequency for controlling a switch in the wireless power transmitter for generating wireless power.

Referring to FIG. 4B, it may be noted that because the diode 220 is connected in parallel to both the resonance circuit 210 and the inductive load 230, a voltage applied to the inductive load 230 has only a positive value. The voltage waveform of FIG. 4B may be repeated at the same frequency as the voltage waveform of FIG. 4A.

Referring to FIG. 4C, it may be noted that a current flowing through the inductive load 230 has only a positive value.

Figure 5:
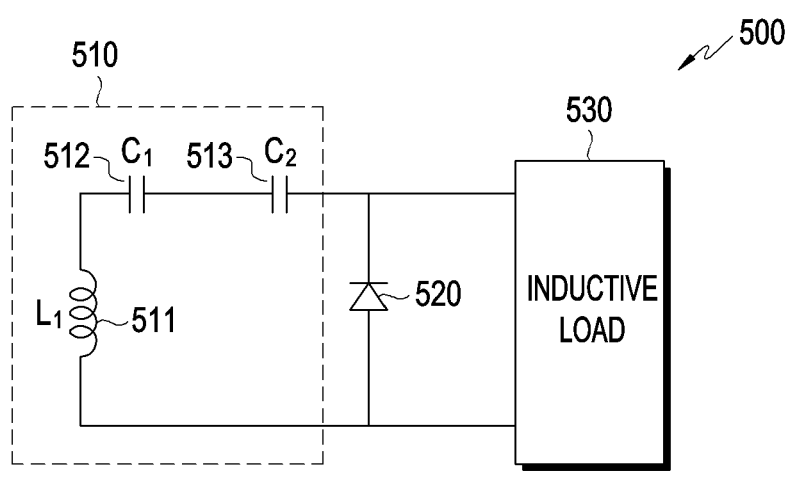
FIG. 5 illustrates a wireless power receiver according to an embodiment.

FIG. 5 illustrates a wireless power receiver according to an embodiment. Referring to FIG. 5, a wireless power receiver 500 according to an embodiment may include a resonance circuit 510, a diode 520, and an inductive load 530. The afore-described details of the diode 220 and the inductive load 230 of FIG. 2 may be equally applicable to the diode 520 and the inductive load 530.

According to an embodiment, the resonance circuit 510 may include a coil 511, a first capacitor 512, and a second capacitor 513. According to an embodiment, the second capacitor 513 may function as a blocking capacitor that blocks a low-frequency component of a current and passes only a high-frequency component of the current. According to an embodiment, capacitance of the second capacitor 513 may be greater than that of the first capacitor 512. For example, the capacitance of the second capacitor 513 may be five or more times larger than that of the first capacitor 512. According to an embodiment, compared to the wireless power receiver 200 of FIG. 2, the wireless power receiver 500 of FIG. 5 may have an improved power factor.

Figure 6:
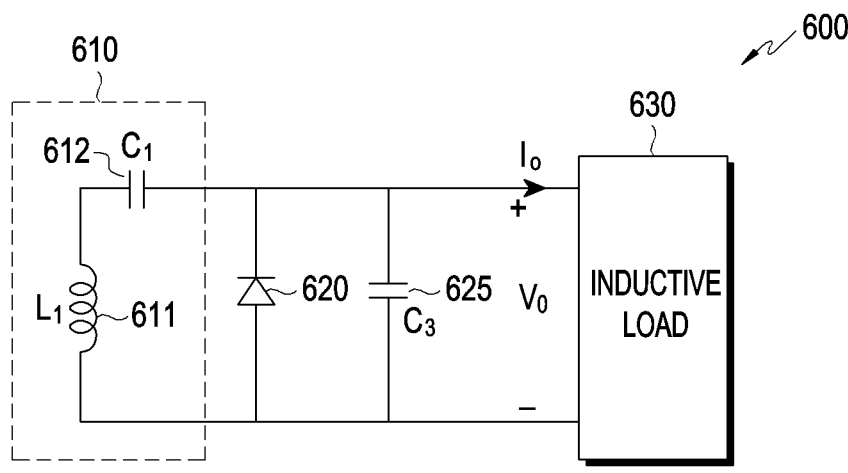
FIG. 6 illustrates a wireless power receiver according to an embodiment.

FIG. 6 illustrates a wireless power receiver according to an embodiment. Referring to FIG. 6, a wireless power receiver 600 according to an embodiment may include a resonance circuit 610 including a coil 611 and a first capacitor 612, a diode 620, a third capacitor 625, and an inductive load 630. The afore-described details of the resonance circuit 210, the diode 220, and the inductive load 230 in FIG. 2 may be equally applicable to the resonance circuit 610, the diode 620, and the inductive load 630. According to an embodiment, unlike the one illustrated in FIG. 6, the resonance circuit 610 may be the resonance circuit 510 illustrated in FIG. 5.

According to an embodiment, capacitance of the third capacitor 625 may be less than capacitance of the first capacitor 612 included in the resonance circuit 610. In one embodiment, the capacitance of the third capacitor 625 may be less than 20% of the capacitance of the first capacitor 612. In one embodiment, the capacitance of the third capacitor 625 may be less than 10% of the capacitance of the first capacitor 612. According to an embodiment, the third capacitor 625 may cancel parasitic capacitance of the inductive load 630. As the parasitic capacitance of the inductive load 630 is canceled by the third capacitor 625, a voltage waveform applied to the inductive load 630 in the wireless power receiver 600 of FIG. 6 may have a smaller high-frequency ripple component than the voltage waveform applied to the inductive load 230 in the wireless power receiver 200 of FIG. 2, as described later with reference to FIGS. 7B and 8B. Since the high-frequency ripple component of the voltage waveform applied to the inductive load 630 is small, the wireless power receiver 600 of FIG. 6 may have improved electromagnetic interference (EMI) characteristics compared to the wireless power receiver 200 of FIG. 2.

According to an embodiment, the capacitance of the third capacitor 625 may be designed to be sufficiently smaller than the capacitance of the first capacitor 612 included in the resonance circuit 610. When the capacitance of the third capacitor 625 is designed to be large enough to be close to the capacitance of the first capacitor 612, not to be small enough, a significant part of a current generated in the resonance circuit may flow through the third capacitor 625, alternative to the diode 620, due to small impedance of the third capacitor 625, and the magnitude of the current flowing through the third capacitor 625 may increase as the capacitance of the third capacitor 625 increases.

Unlike power supplied to the inductive load 630 through the diode 620, power supplied to the inductive load 630 through the third capacitor 625 may have a voltage and/or current alternating between positive and negative values. As described above with reference to FIG. 2, since the rotation speed of a motor included in the inductive load 630 depends on the average of voltages applied to the motor during one period, power supplied to the inductive load 630 through the third capacitor 625 does not contribute to rotation of the motor included in the inductive load 630. Since the magnitude of the current flowing through the third capacitor 625 increases as the capacitance of the third capacitor 625 increases, more of the induced current generated in the resonance circuit 610 may be wasted without contributing to the rotation of the motor included in the inductive load 630.

Figure 7A:
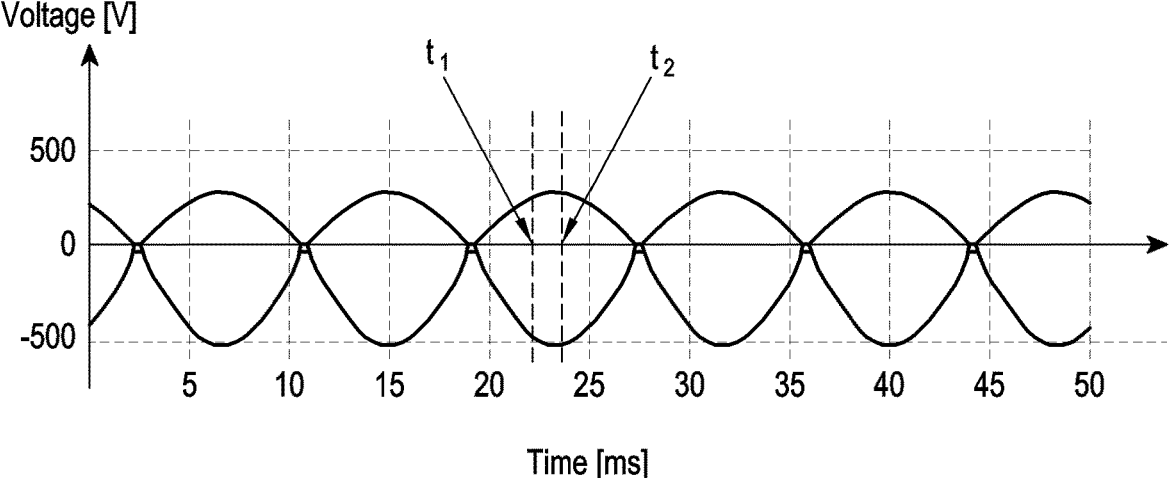
FIG. 7A illustrates a waveform of a voltage across a first coil in a wireless power receiver according to an embodiment.
Figure 7B:
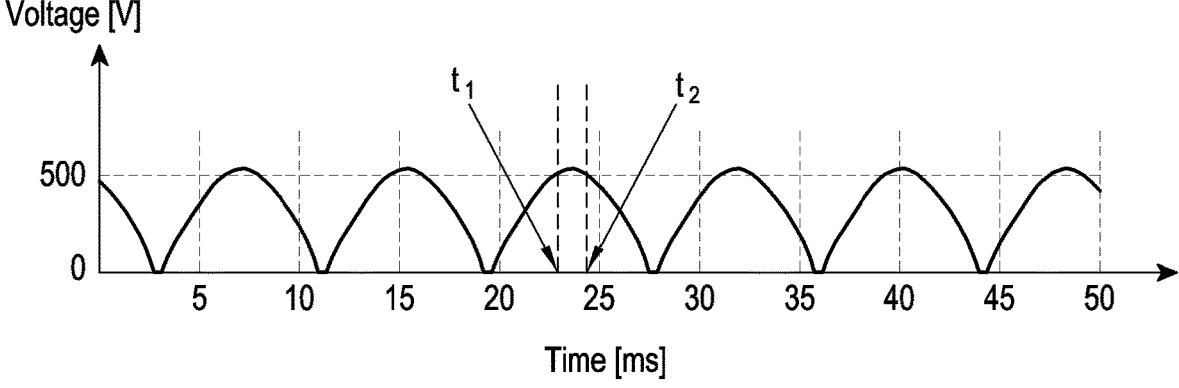
FIG. 7B illustrates a waveform of a voltage applied to an inductive load in a wireless power receiver according to an embodiment.
Figure 7C:
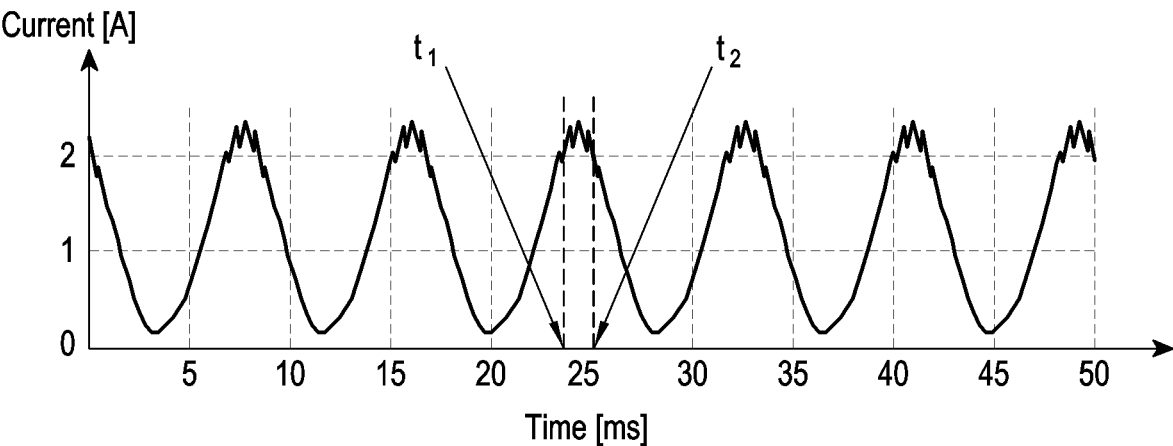
FIG. 7C illustrates a waveform of a current flowing through an inductive load in a wireless power receiver according to an embodiment.

FIG. 7A illustrates a waveform of a voltage across a coil included in a resonance circuit of a wireless power receiver according to an embodiment. FIG. 7B illustrates a waveform of a voltage applied to an inductive load in a wireless power receiver according to an embodiment. FIG. 7C illustrates a waveform of a current flowing through an inductive load in a wireless power receiver according to an embodiment. Specifically, FIG. 7A illustrates a voltage across the coil 511 in the wireless power receiver 500 illustrated in FIG. 5. FIG. 7B illustrates a voltage applied to the inductive load 530 in the wireless power receiver 500 illustrated in FIG. 5. FIG. 7C illustrates a current flowing through the inductive load 530 in the wireless power receiver 500 illustrated in FIG. 5.

Referring to FIG. 7A, the voltage applied across the coil 511 of the wireless power receiver 500 may have a positive value and a negative value and be repeated at regular intervals. A frequency at which the voltage waveform of FIG. 7A is repeated may be a frequency of power supplied to the wireless power transmitter, for example, 60 Hz.

Referring to FIG. 7B, it may be noted that because the diode 520 is connected in parallel to both the resonance circuit 510 and the inductive load 530, a voltage applied to the inductive load 530 has only a positive value. The voltage waveform of FIG. 7B may be repeated at the same frequency as the voltage waveform of FIG. 7A.

Referring to FIG. 7C, it may be noted that the current flowing through the inductive load 530 has only a positive value. The current waveform of FIG. 7C may be repeated at the same frequency as the voltage waveform of FIG. 7A.

A comparison between FIGS. 7A to 7C and FIGS. 3A to 3C may reveal that the waveforms illustrated in FIGS. 7A to 7C have smaller high-frequency ripple components than the waveforms illustrated in FIGS. 3A to 3C. This is because the third capacitor 625 of FIG. 6 cancels the parasitic capacitance of the inductive load 630, as described before with reference to FIG. 6.

Figure 8A:
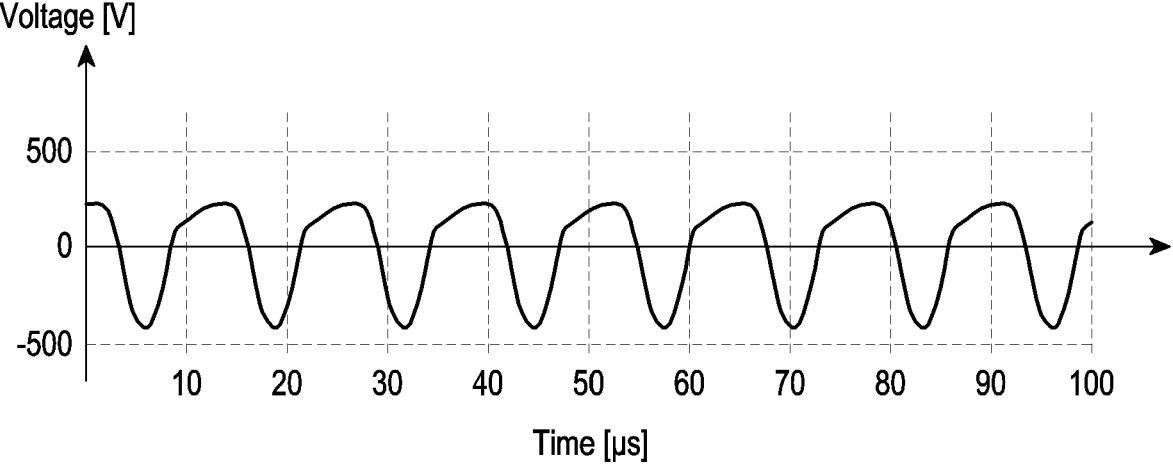
FIG. 8A illustrates a waveform of a voltage across a first coil in a wireless power receiver according to an embodiment.
Figure 8B:
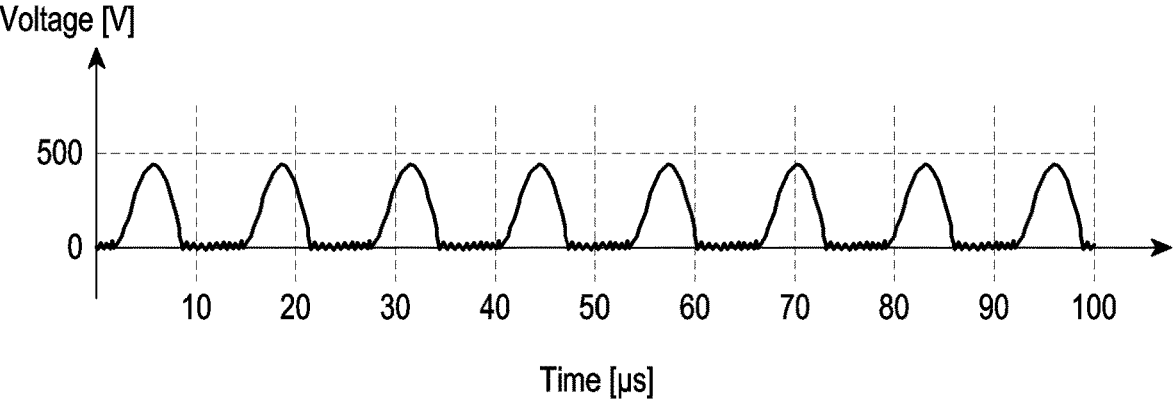
FIG. 8B illustrates a waveform of a voltage applied to an inductive load in a wireless power receiver according to an embodiment.
Figure 8C:
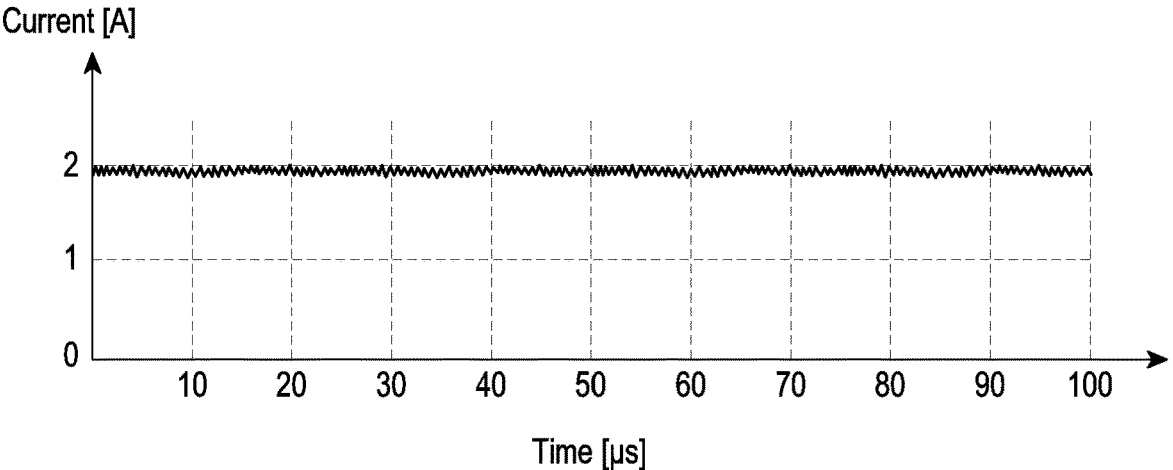
FIG. 8C illustrates a waveform of a current flowing through an inductive load in a wireless power receiver according to an embodiment.

FIG. 8A illustrates a waveform of a voltage across a coil included in a resonance circuit of a wireless power receiver according to an embodiment. FIG. 8B illustrates a waveform of a voltage applied to an inductive load in a wireless power receiver according to an embodiment. FIG. 8C illustrates a waveform of a current flowing through an inductive load in a wireless power receiver according to an embodiment. Specifically, FIG. 8A is an enlarged view illustrating a waveform during a period between $t_{-1}$ and $t_2$ in the waveform illustrated in FIG. 7A. FIG. 8B is an enlarged view illustrating a waveform during a period between $t_{-1}$ and $t_2$ in the waveform illustrated in FIG. 7B. FIG. 8C is an enlarged view illustrating a waveform during a period between $t_{-1}$ and $t_2$ in the waveform illustrated in FIG. 7C.

Referring to FIG. 8A, a voltage applied across the coil 511 of the wireless power receiver 500 may have a positive value and a negative value and be repeated at regular intervals. A frequency at which the voltage waveform of FIG. 8A is repeated may be a switching frequency for controlling a switch in a wireless power transmitter for generating wireless power.

Referring to FIG. 8B, it may be noted that because the diode 520 is connected in parallel to both the resonance circuit 510 and the inductive load 530, a voltage applied to the inductive load 530 has only a positive value. The voltage waveform of FIG. 8B may repeat at the same frequency as the voltage waveform of FIG. 8A.

Referring to FIG. 8C, it may be noted that a current flowing through the inductive load 530 has only a positive value.

A comparison between FIGS. 8A to 8C and FIGS. 4A to 4C may reveal that the waveforms illustrated in FIGS. 8A to 8C have smaller high-frequency ripple components than the waveforms illustrated in FIGS. 4A to 4C. This is because the third capacitor 625 of FIG. 6 cancels the parasitic capacitance of the inductive load 630, as described before with reference to FIG. 6.

Figure 9:
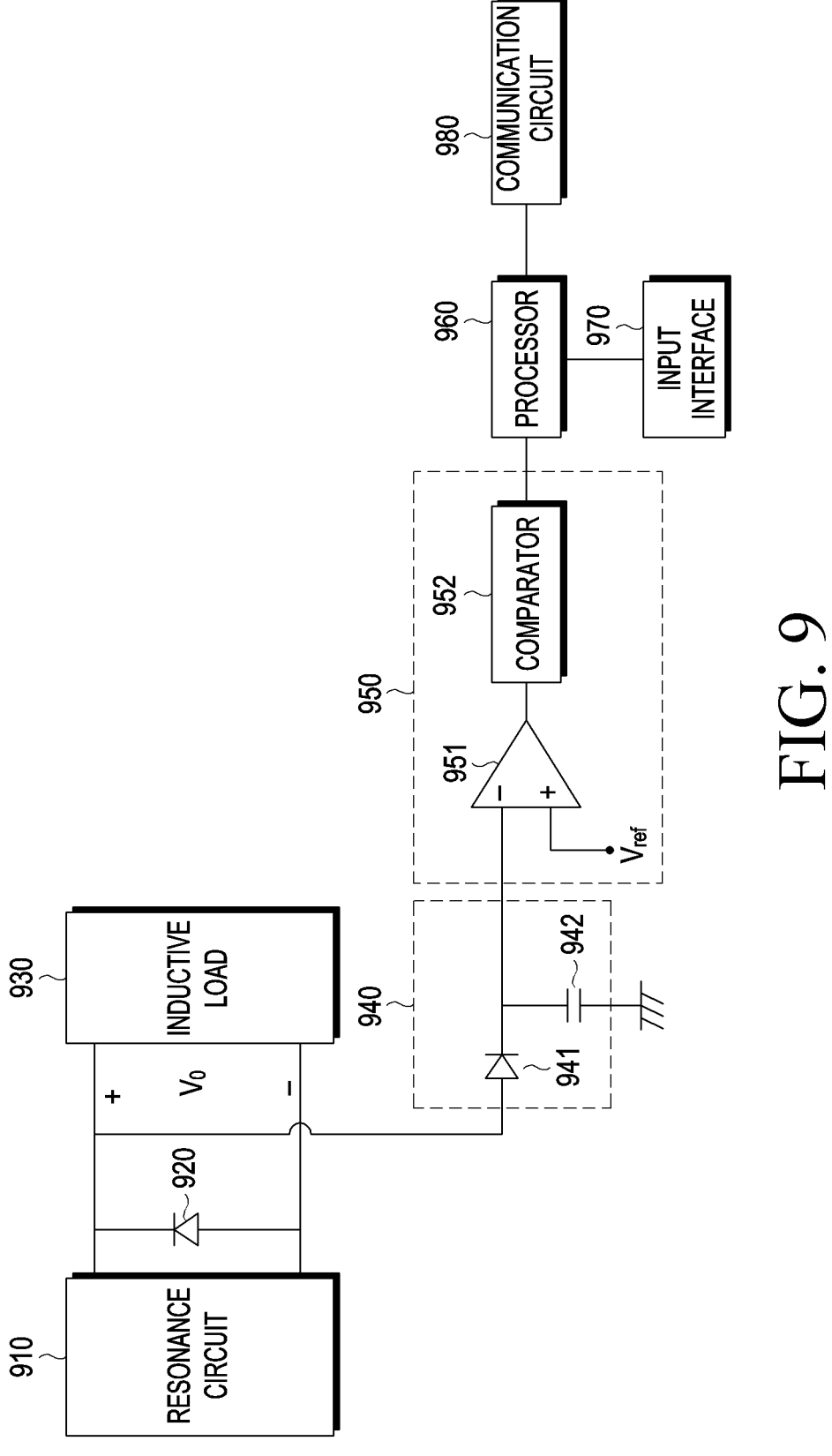
FIG. 9 illustrates a wireless power receiver according to an embodiment.

FIG. 9 illustrates a wireless power receiver according to an embodiment. A wireless power receiver 900 according to an embodiment may include a resonance circuit 910, a diode 920, an inductive load 930, a detection circuit 940, a comparison circuit 950, a processor 960, an input interface 970, and a communication circuit 980.

According to an embodiment, the resonance circuit 910 may be the resonance circuit 210 described before with reference to FIG. 2 or the resonance circuit 510 described before with reference to FIG. 5. According to an embodiment, the wireless power receiver 900 may further include a third capacitor 625 connected in parallel to the resonance circuit 910, the diode 920, and the inductive load 930. The afore-described details of the diode 220 and the inductive load 230 of FIG. 2 may be equally applicable to the diode 920 and the inductive load 930.

According to an embodiment, the detection circuit 940 may include a diode 941 and a capacitor 942. The detection circuit 940 may output a peak value of a voltage $V_o$ applied to the inductive load 930. According to an embodiment, the detection circuit 940 may output a peak value of a current flowing through the inductive load 930 differently from that illustrated in FIG. 9. According to an embodiment, the detection circuit 940 may have a structure different from that illustrated in FIG. 9. According to an embodiment, as far as the detection circuit 940 is capable of outputting a representative value representing the voltage $V_o$ applied to the inductive load 930 and/or the current flowing through the inductive load 930, its configuration is not limited. While the following description is given in the context of the peak value of the voltage $V_o$ applied to the inductive load 930, those skilled in the art will understand that the peak value of the current flowing through the inductive load 930 or any representative value representing the voltage $V_o$ applied to the inductive load 930 and/or the current flowing through the inductive load 930 is applicable in the following description according to an embodiment.

According to an embodiment, the comparison circuit 950 may include an amplifier 951 and a comparator 952. In the example of FIG. 9, the amplifier 951 may output a difference between the peak value of the voltage $V_o$ output from the detection circuit 940 and applied to the inductive load 930 and a specific voltage value $V_{ref}$. According to an embodiment, the specific voltage value $V_{ref}$ to be compared may be a value corresponding to a user input applied through the input interface 970 to be described later.

According to an embodiment, the comparator 952 may determine whether the difference between the peak value of the voltage $V_o$ applied to the inductive load 930 and the specific voltage value $V_{ref}$ falls within a predetermined range, and provide a determination result to the processor 960.

According to an embodiment, there may be one or more processors 960, and the number of processors is not limited. According to an embodiment, the processor 960 may control the communication circuit 980 to transmit a signal to a wireless power transmitter based on a signal received from the comparison circuit 950.

Specifically, the processor 960 may control the communication circuit 980 to transmit a signal to the wireless power transmitter based on the difference between the peak value of the voltage $V_o$ applied to the inductive load 930 and the specific voltage value $V_{ref}$. For example, when the difference between the peak value of the voltage $V_o$ applied to the inductive load 930 and the specific voltage value $V_{ref}$ falls within the predetermined range, the processor 960 may not control the communication circuit 980 to transmit the signal to the wireless power transmitter. Alternatively, when the difference between the peak value of the voltage $V_o$ applied to the inductive load 930 and the specific voltage value $V_{ref}$ is outside the predetermined range, the processor 960 may control the communication circuit 980 to transmit the signal to the wireless power transmitter. The signal transmitted from the communication circuit 980 to the wireless power transmitter may indicate the difference between the peak value of the voltage $V_o$ applied to the inductive load 930 and the specific voltage value $V_{ref}$. Alternatively, according to an embodiment, the signal transmitted from the communication circuit 980 to the wireless power transmitter may indicate any parameter value representing the voltage $V_o$ applied to the inductive load 930.

According to an embodiment, the signal transmitted from the communication circuit 980 to the wireless power transmitter may instruct the wireless power transmitter to increase or decrease the amount of wireless power transmitted from the wireless power transmitter to the wireless power receiver 900.

According to an embodiment, the processor 960 may identify a voltage value $V_{ref}$ corresponding to a user input applied through the input interface 970, and apply the identified voltage value $V_{ref}$ to the comparator 952. According to an embodiment, the wireless power receiver 900 may further include memory, and the processor 960 may identify the voltage value $V_{ref}$ corresponding to the user input applied through the input interface 970, referring to a mapping relationship between user inputs and voltage values stored in the memory.

According to an embodiment, the input interface 970 may receive an input related to an operation intensity of the wireless power receiver 900 from a user. For example, the input interface 970 may include at least one of a physical button, a touch pad, or a touch screen display. According to an embodiment, the user input may be related to the operation intensity of the wireless power receiver 900. For example, when the inductive load 930 includes a motor, the user input may specify a rotation speed of the motor.

According to an embodiment, an input from the user may be applied to an electronic device other than the wireless power receiver 900, and the wireless power receiver 900 may identify the user input by receiving a signal representing the user input through the communication circuit 980.

According to an embodiment, the communication circuit 980 may perform wireless communication with an electronic device other than the wireless power receiver 900. For example, the communication circuit 980 may perform wireless communication with a wireless power transmitter that provides wireless power to the wireless power receiver 900. According to an embodiment, the type of wireless communication supported by the communication circuit 980 is not limited.

Figure 10:
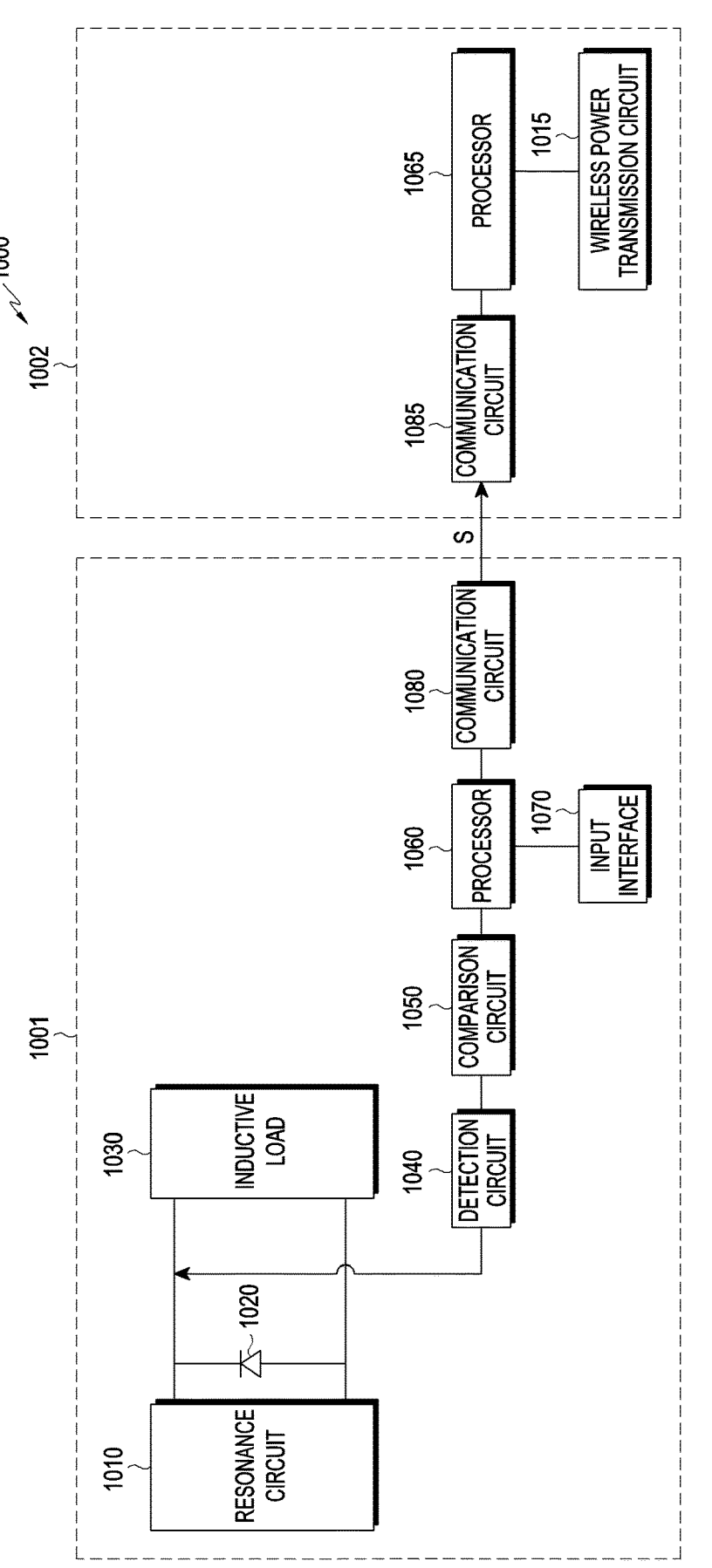
FIG. 10 illustrates a wireless power transmission system including a wireless power receiver according to an embodiment.

FIG. 10 illustrates a wireless power transmission system including a wireless power receiver according to an embodiment. A wireless power transmission system 1000 according to an embodiment may include a wireless power receiver 1001 and a wireless power transmitter 1002. The wireless power receiver 1001 may include a resonance circuit 1010, a diode 1020, an inductive load 1030, a detection circuit 1040, a comparison circuit 1050, a processor 1060, an input interface 1070, and a communication circuit 1080. The details described before with reference to FIG. 9 may be equally applied to each component of the wireless power receiver 1001.

According to an embodiment, the wireless power transmitter 1002 may include a communication circuit 1085, a processor 1065, and a wireless power transmission circuit 1015. According to an embodiment, the wireless power transmitter 1002 may be an induction cooker, and the wireless power receiver 1001 may operate based on wireless power provided by the induction cooker, while being placed on the induction cooker.

According to an embodiment, the communication circuit 1085 may perform wireless communication with an electronic device other than the wireless power transmitter 1002. For example, the communication circuit 1085 may perform wireless communication with the wireless power receiver 1001 receiving wireless power from the wireless power transmitter 1002. According to an embodiment, the type of wireless communication supported by the communication circuit 1085 is not limited.

As described before with reference to FIG. 9, the processor 1060 of the wireless power receiver 1001 may control the communication circuit 980 to transmit a signal S to the communication circuit 1085 based on the voltage $V_o$ applied to the inductive load 930 or the current flowing through the inductive load 930. According to an embodiment, the signal S may indicate that the voltage $V_o$ applied to the inductive load 930 or the current flowing through the inductive load 930 is less than a voltage or current corresponding to a user input through the input interface 1070. In this case, the processor 1065 of the wireless power transmitter 1002 may control the wireless power transmission circuit 1015 to increase the amount of wireless power transmitted to the wireless power receiver 1001. Alternatively, the signal S may indicate that the voltage $V_o$ applied to the inductive load 930 or the current flowing through the inductive load 930 is greater than the voltage or current corresponding to the user input through the input interface 1070. In this case, the processor 1065 of the wireless power transmitter 1002 may control the wireless power transmission circuit 1015 to decrease the amount of wireless power transmitted to the wireless power receiver 1001.

According to an embodiment, the processor 1065 of the wireless power transmitter 1002 may control the wireless power transmission circuit 1015 to adjust a switching frequency that is the frequency of a switching signal applied to a switch included in the wireless power transmission circuit 1015, in order to generate a magnetic field for transmitting wireless power. When the signal S indicates that the voltage $V_o$ applied to the inductive load 930 or the current flowing through the inductive load 930 is less than the voltage or current corresponding to the user input through the input interface 1070, the processor 1065 of the wireless power transmitter 1002 may control the wireless power transmission circuit 1015 to decrease the switching frequency.

In one embodiment, when the signal S indicates that the voltage $V_o$ applied to the inductive load 930 or the current flowing through the inductive load 930 is greater than the voltage or current corresponding to the user input through the input interface 1070, the processor 1065 of the wireless power transmitter 1002 may control the wireless power transmission circuit 1015 to increase the switching frequency.

A wireless power receiver according to an embodiment may include a resonance circuit configured to generate an induced current based on a magnetic field generated by a wireless power transmitter, a diode connected to both ends of the resonance circuit, and an inductive load connected to both ends of the diode.

According to an embodiment, the resonance circuit may include a coil and a first capacitor.

According to an embodiment, the resonance circuit may further include a second capacitor, a first end of the first capacitor may be connected to a first end of the coil, and a second end of the first capacitor may be connected to a first end of the second capacitor.

According to an embodiment, the inductive load may include a motor.

According to an embodiment, the wireless power receiver may further include a third capacitor connected to both ends of the diode.

According to an embodiment, capacitance of the third capacitor may be 20% or less of capacitance of the first capacitor.

According to an embodiment, capacitance of the third capacitor may be 10% or less of capacitance of the first capacitor.

According to an embodiment, the wireless power receiver may further include a detection circuit configured to detect at least one of a voltage applied to the inductive load or a current flowing through the inductive load.

According to an embodiment, the wireless power receiver may further include a communication circuit and at least one processor, and the at least one processor may be configured to control the communication circuit to transmit a signal to the wireless power transmitter based on the at least one of the voltage applied to the inductive load or the current flowing through the inductive load, detected by the detection circuit.

According to an embodiment, the wireless power receiver may further include an input interface, and the at least one processor may be configured to control the communication circuit to transmit a signal to the wireless power transmitter based on at least one of a voltage or a current corresponding to a user input through the input interface.

According to an embodiment, the wireless power receiver may further include a comparison circuit, and the comparison circuit may be configured to compare the at least one of the voltage or the current corresponding to the user input with the at least one of the voltage applied to the inductive load or the current flowing through the inductive load, detected by the detection circuit.

According to an embodiment, the at least one processor may be configured to control the communication circuit to transmit the signal to the wireless power transmitter based on a difference between the voltage corresponding to the user input and the voltage applied to the inductive load, detected by the detection circuit or a difference between the current corresponding to the user input and the current flowing through the inductive load, detected by the detection circuit, from the comparison circuit.

According to an embodiment, a wireless power transmission system may include a wireless power transmitter and a wireless power receiver, and the wireless power receiver may include a resonance circuit configured to generate an induced current based on a magnetic field generated by the wireless power transmitter, a diode connected to both ends of the resonance circuit, and an inductive load connected to both ends of the diode.

According to an embodiment, the resonance circuit may include a coil and a first capacitor.

According to an embodiment, the resonance circuit may further include a second capacitor, a first end of the first capacitor may be connected to a first end of the coil, and a second end of the first capacitor may be connected to a first end of the second capacitor.

According to an embodiment, the inductive load may include a motor.

According to an embodiment, the wireless power receiver may further include a third capacitor connected to both ends of the diode.

According to an embodiment, the wireless power receiver may further include a detection circuit configured to detect at least one of a voltage applied to the inductive load or a current flowing through the inductive load, a first communication circuit, and at least one processor to control the first communication circuit to transmit a signal to the wireless power transmitter based on the at least one of the voltage applied to the inductive load or the current flowing through the inductive load, detected by the detection circuit. The wireless power transmitter may be configured to adjust a switching frequency for generating the magnetic field based on the signal.

According to an embodiment, the wireless power receiver may further include an input interface, and the at least one processor may be configured to control the communication circuit to transmit a signal to the wireless power transmitter based on at least one of a voltage or a current corresponding to a user input through the input interface.

According to an embodiment, the wireless power receiver may further include a comparison circuit configured to compare at least one of the voltage or the current corresponding to the user input with at least one of the voltage applied to the inductive load or the current flowing through the inductive load, detected by the detection circuit. When the voltage applied to the inductive load, detected by the detection circuit is greater than the voltage corresponding to the user input through the input interface or the current flowing through the inductive load, detected by the detection circuit is greater than the current corresponding to the user input through the input interface, the signal may instruct the wireless power transmitter to increase the switching frequency. When the voltage applied to the inductive load, detected by the detection circuit is less than the voltage corresponding to the user input through the input interface or the current flowing through the inductive load, detected by the detection circuit is less than the current corresponding to the user input, the signal may instruct the wireless power transmitter to decrease the switching frequency.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

What is claimed is:

1. A wireless power receiver comprising:
a resonance circuit configured to generate an induced current based on a magnetic field generated by a wireless power transmitter,
a diode directly connected to a first end of the resonance circuit and directly connected to a second end of the resonance circuit, and
an inductive load connected to a first end of the diode and a second end of the diode,
wherein the inductive load has a positive reactance of impedance,
wherein the induced current generated by the resonance circuit is an output transmitted to the inductive load.

2. The wireless power receiver of claim 1, wherein the resonance circuit comprises a coil and a first capacitor.

3. The wireless power receiver of claim 2, wherein the resonance circuit further comprises a second capacitor,
wherein a first end of the first capacitor is connected to a first end of the coil, and
wherein a second end of the first capacitor is connected to a first end of the second capacitor.

4. The wireless power receiver of claim 1, wherein the inductive load comprises a motor.

5. The wireless power receiver of claim 2, further comprising a third capacitor connected to the first end of the diode and to the second end of the diode.

6. The wireless power receiver of claim 5, wherein capacitance of the third capacitor is 20% or less than capacitance of the first capacitor.

7. The wireless power receiver of claim 5, wherein capacitance of the third capacitor is 10% or less than capacitance of the first capacitor.

8. The wireless power receiver of claim 1, further comprising a detection circuit configured to detect at least one of a voltage applied to the inductive load or a current flowing through the inductive load.

9. The wireless power receiver of claim 8, further comprising:
a communication circuit, and
at least one processor,
wherein the at least one processor is configured to control the communication circuit to transmit a first signal to the wireless power transmitter based on the at least one of the voltage applied to the inductive load or the current flowing through the inductive load, the voltage and the current being detected by the detection circuit.

10. The wireless power receiver of claim 9, further comprising an input interface, wherein the at least one processor is further configured to control the communication circuit to transmit a second signal to the wireless power transmitter based on at least one of a voltage corresponding to a user's input or a current corresponding to the user's input through the input interface.

11. The wireless power receiver of claim 10, further comprising a comparison circuit, wherein the comparison circuit is configured to compare the at least one of the voltage or the current corresponding to the user's input with the at least one of the voltage applied to the inductive load or the current flowing through the inductive load, the voltage and the current being detected by the detection circuit.

12. The wireless power receiver of claim 11, wherein the at least one processor is further configured to control the communication circuit to transmit a third signal to the wireless power transmitter based on:
a difference between the voltage corresponding to the user's input and the voltage applied to the inductive load, the voltage applied to the inductive load being detected by the detection circuit, or
a difference between the current corresponding to the user's input and the current flowing through the inductive load, the current flowing through the inductive load being detected by the detection circuit.

13. A wireless power transmission system comprising:
a wireless power transmitter and a wireless power receiver,
wherein the wireless power receiver comprises:
a resonance circuit configured to generate an induced current based on a magnetic field generated by the wireless power transmitter,
a diode directly connected to a first end of the resonance circuit and directly connected to a second end of the resonance circuit, and
an inductive load connected to a first end of the diode and to a second end of the diode,
wherein the inductive load has a positive reactance of impedance,
wherein the induced current generated by the resonance circuit is an output transmitted to the inductive load.

14. The wireless power transmission system of claim 13, wherein the resonance circuit comprises a coil and a first capacitor.

15. The wireless power transmission system of claim 14, wherein the resonance circuit further comprises a second capacitor,
wherein a first end of the first capacitor is connected to a first end of the coil, and
wherein a second end of the first capacitor is connected to a first end of the second capacitor.

16. The wireless power transmission system of claim 13, wherein the inductive load comprises a motor.

17. The wireless power transmission system of claim 14, wherein the wireless power receiver further comprises a third capacitor connected to the first end of the diode and to the second end of the diode.

18. The wireless power transmission system of claim 13, wherein the wireless power receiver comprises:
a detection circuit configured to detect at least one of a voltage applied to the inductive load or a current flowing through the inductive load,
a communication circuit, and
at least one processor to control the communication circuit to transmit a signal to the wireless power transmitter based on the at least one of the voltage applied to the inductive load or the current flowing through the inductive load, the voltage and the current being detected by the detection circuit,
wherein the wireless power transmitter adjusts a switching frequency for generating the magnetic field based on the signal.

19. The wireless power transmission system of claim 18, wherein the wireless power receiver further comprises an input interface, and wherein the at least one processor is configured to control the communication circuit to transmit the signal to the wireless power transmitter based on at least one of a voltage corresponding to a user's input or a current corresponding to the user's input through the input interface.

20. The wireless power transmission system of claim 19, wherein the wireless power receiver further comprises a comparison circuit configured to compare at least one of the voltage or the current corresponding to the user's input with at least one of the voltage applied to the inductive load or the current flowing through the inductive load, the voltage and the current being detected by the detection circuit, when the voltage applied to the inductive load, detected by the detection circuit is greater than the voltage corresponding to the user's input through the input interface or the current flowing through the inductive load, detected by the detection circuit is greater than the current corresponding to the user's input through the input interface, the signal instructs the wireless power transmitter to increase the switching frequency, and when the voltage applied to the inductive load, detected by the detection circuit is less than the voltage corresponding to the user's input through the input interface or the current flowing through the inductive load, detected by the detection circuit is less than the current corresponding to the user's input, the signal instructs the wireless power transmitter to decrease the switching frequency.

\* \* \* \* \*